(12) United States Patent
Sun et al.

(10) Patent No.: US 11,926,572 B2
(45) Date of Patent: Mar. 12, 2024

(54) SPECIAL FERTILIZER FOR INTERCROPPING MAIZE AND PEANUTS AND CULTIVATION METHOD FOR MAINTAINING SOIL ORGANIC CARBON BALANCE

(71) Applicant: Liaoning Academy of Agricultural Sciences, Shenyang (CN)

(72) Inventors: Zhanxiang Sun, Shenyang (CN); Liangshan Feng, Shenyang (CN); Ning Yang, Shenyang (CN); Fengyan Zhao, Shenyang (CN); Yue Men, Shenyang (CN); Chen Feng, Shenyang (CN); Yilai Lou, Beijing (CN); Yongyong Zhang, Shenyang (CN); Ping Wang, Shenyang (CN); Xianglong Sun, Shenyang (CN)

(73) Assignee: LIAONING ACADEMY OF AGRICULTURAL SCIENCES, Shenyang (CN)

( * ) Notice: Subject to any disclaimer, the term of this patent is extended or adjusted under 35 U.S.C. 154(b) by 0 days.

(21) Appl. No.: 17/981,026

(22) Filed: Nov. 4, 2022

(65) Prior Publication Data
US 2023/0167037 A1 Jun. 1, 2023

(30) Foreign Application Priority Data
Dec. 1, 2021 (CN) .......................... 202111457974.9

(51) Int. Cl.
| | |
|---|---|
| *C05G 1/00* | (2006.01) |
| *A01C 21/00* | (2006.01) |
| *C05B 1/02* | (2006.01) |
| *C05B 7/00* | (2006.01) |
| *C05C 3/00* | (2006.01) |
| *C05C 9/00* | (2006.01) |
| *C05D 9/02* | (2006.01) |
| *C05F 5/00* | (2006.01) |
| *C05F 11/02* | (2006.01) |
| *C05G 5/30* | (2020.01) |
| *C05G 5/40* | (2020.01) |

(52) U.S. Cl.
CPC .............. *C05G 1/00* (2013.01); *A01C 21/005* (2013.01); *C05B 1/02* (2013.01); *C05B 7/00* (2013.01); *C05C 3/005* (2013.01); *C05C 9/005* (2013.01); *C05D 9/02* (2013.01); *C05F 5/002* (2013.01); *C05F 11/02* (2013.01); *C05G 5/37* (2020.02); *C05G 5/40* (2020.02)

(58) Field of Classification Search
CPC ... C05G 1/00; C05G 5/37; C05G 3/80; C05G 5/30; C05G 3/90; A01C 21/005; A01C 21/00; C05B 1/02; C05B 7/00; C05B 17/00; C05B 1/04; C05C 3/005; C05C 9/005; C05C 9/00; C05C 11/00; C05C 3/00; C05D 9/02; C05D 9/00; C05D 1/00; C05F 5/002; C05F 11/02; C05F 5/008; A01B 79/02
See application file for complete search history.

(56) References Cited

FOREIGN PATENT DOCUMENTS

| CN | 103650887 A | | 3/2014 | |
|---|---|---|---|---|
| CN | 104380968 A | * | 3/2015 | ............. A01G 1/001 |
| CN | 105198619 A | * | 12/2015 | |
| CN | 105198619 A | | 12/2015 | |
| CN | 113149766 A | | 7/2021 | |

OTHER PUBLICATIONS

A. Polthanee et al., "Growth, Yield and Land Use Efficiency of Corn and Legumes Grown under Intercropping System," Plant Prod. Sci. 6(2): 139-146 (2003).*

* cited by examiner

*Primary Examiner* — Monica A Shin
(74) *Attorney, Agent, or Firm* — Zhigang Ma

(57) ABSTRACT

Disclosed are a special fertilizer for intercropping maize and peanuts and a cultivation method for maintaining soil organic carbon (SOC) balance, belonging to the technical field of SOC balance. The special fertilizer for intercropping maize and peanuts includes the following raw materials: coated urea, heavy superphosphate, ammonium sulfate, fermented soybean meal, bentonite, sodium molybdate, borax, humic acid, ammonium dihydrogen phosphate, plant ash and zinc sulfate heptahydrate. The cultivation method includes the steps of land selection, land preparation, fertilizing, sowing, field management, and rotation.

6 Claims, 1 Drawing Sheet

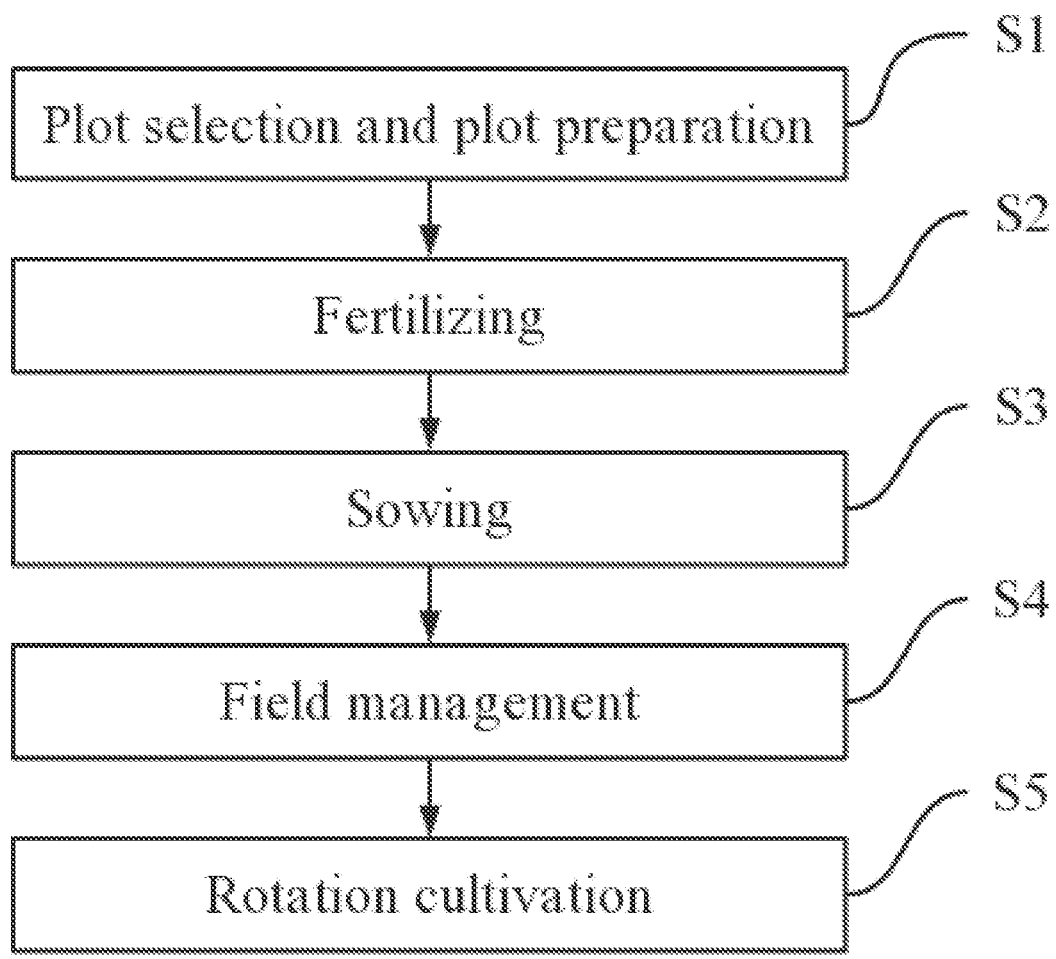

SPECIAL FERTILIZER FOR INTERCROPPING MAIZE AND PEANUTS AND CULTIVATION METHOD FOR MAINTAINING SOIL ORGANIC CARBON BALANCE

CROSS-REFERENCE TO RELATED APPLICATIONS

This application claims priority to Chinese Patent Application No. 202111457974.9, filed on Dec. 1, 2021, the contents of which are hereby incorporated by reference.

TECHNICAL FIELD

The present application relates to the technical field of soil organic carbon balance, and in particular to a special fertilizer for intercropping maize and peanuts and a cultivation method for maintaining soil organic carbon balance.

BACKGROUND

Soil organic carbon (SOC) refers to all kinds of carbon-containing organic compounds in the soil with positive valence; it is a vital component of soil, which is closely related to soil fertility and impacts the carbon cycle of the earth greatly; meanwhile, it is both a "source" and an important "sink" of greenhouse gases. SOC is complicated in composition, structure and cyclic transformation process, and has always been a research focus and core issue of soil science.

SOC balance is a process of carbon cycle, in which green plants and autotrophic microorganisms absorb carbon dioxide in an atmosphere by using solar light energy and other forms of chemical energy, and convert it into organic compounds for energy storage, while humans and other higher animals obtain materials and energy from plants and return dead tissues and wastes to the soil. After the dead tissues and wastes are decomposed by microorganisms and the nutrients in them are released, some of the carbon is transformed into stable soil humus and some is released into the atmosphere in the form of carbon dioxide for absorption by plants again. This cycle is accompanied by the conversion of energy, with the participation of the full range of biological forms, together with the life cycle of each of them. Effective carbon is a good soil conditioner that solves the problem of soil caking, and organic carbon compounds are good antidotes, while soil with a low content of SOC is often accompanied with problems of, in addition to soil caking and phytotoxicity, affected growth of crops, including crop root weakness, slow growth, disease prevention function decline, quality decline, species degradation and so on. Therefore, it is important to maintain SOC balance for improving soil structure and promoting crop growth.

SUMMARY

The present application provides a special fertilizer for intercropping maize and peanuts as well as a cultivation method for maintaining soil organic carbon (SOC) balance, so as to improve soil in terms of structure and provide a good environment for a growth and reproduction of crops.

To achieve the above objectives, the present application adopts the following technical schemes:

one of the objectives of the present application is to provide a special fertilizer for intercropping maize and peanuts, including the following raw materials in parts by weight: 40-50 parts of coated urea, 20-30 parts of double superphosphate, 15-20 parts of ammonium sulfate, 3-5 parts of fermented soybean meal, 20-30 parts of bentonite, 1-1.5 parts of sodium molybdate, 5-8 parts of borax, 5-10 parts of humic acid, 5-10 parts of ammonium dihydrogen phosphate, 3-5 parts of plant ash, and 1-3 parts of zinc sulfate heptahydrate.

Optionally, the coated urea is urea coated with fly ash and polyvinyl alcohol as coating materials, with dicyandiamide also added for preparing the coated urea.

Optionally, the fly ash and polyvinyl alcohol are in an amount of accounting for 20 percent (%) of a total weight of the coated urea, where the fly ash and the polyvinyl alcohol are in a mass ratio of 3:1.

Optionally, the dicyandiamide is in an amount of 3% of the total weight of coated urea.

According to the present application, the coated urea is prepared using fly ash and polyvinyl alcohol as coating materials with an addition of dicyandiamide while preparing the coated urea, and the coated urea is used to ensure supply of available nutrient such as nitrogen (N), phosphorus (P) and potassium (K) and so on in the early stage of peanut growing, therefore facilitating fast and early development of peanut in addition to forming of a rather ideal nutrient body, thus reducing a shading effect of maize in the later stage; the urea is released and converted with better control under the addition of dicyandiamide, contributing to an improved seasonal utilization rate of nutrients and crop yield; besides, the coated urea transforms easily after being applied into the soil and does not remain in the soil and crop.

With excellent physical properties and chemical stability, including small hygroscopicity, difficult caking, ammonium sulfate is used as a nitrogen fertilizer in the present application; as a quick-acting fertilizer, ammonium sulfate is suitable for carbonaceous soil with acidic reaction, and provides also a small amount of sulfur in addition to nitrogen, which is extremely beneficial to the growth and development of crops.

Superphosphate is a phosphate fertilizer of the present application with high fertilizing efficiency and strong adaptability, and works to improve alkaline soil and supplies mainly hosphorus and calcium to plants, and promote plants in terms of germinating, root and stem developing, branching, fruiting and maturing; Superphosphate also has a certain effect of abiotic nitrogen fixation when mixed with nitrogen fertilizer. Ammonium dihydrogen phosphate is a binary compound fertilizer with a total nutrient content greater than 73%, including more than 61% phosphorus, contains a low nitrogen to phosphorus ratio and provides safe and effective phosphorus, promotes rooting and strengthens seedlings in the seedling growth stage of crops; ammonium dihydrogen phosphate, together with coated urea, ammonium sulfate, are applied in combination according to the present application so as to meet the nutritional requirements of plants in each growth period.

Plant ash is rich in potassium which promotes nitrogen metabolism and sugar synthesis and transport in plants, boosts seed germination and rooting of plants and prevents defoliation; potassium also makes plants grow robust, and enhances their ability to resist diseases, pests and natural disasters.

Fermented soybean meal contains beneficial microorganisms, with advantages of few chemical compositions, non-toxic and harmless, comprehensive nutrients, etc., which are beneficial to plant growth, crop immunity and resistance improvement, and reduces fertilizer damage and increases production and income; fermented soybean meal accelerates the degradation and transformation of organic matters in the soil, thus improving soil fertility and soil consolidation. Bentonite has strong fertilizer and water retention properties as it can absorb water and swell after being applied to the soil; it also strengthens the buffering capacity of the soil, and then improves the soil fertility.

Sodium molybdate provides trace molybdenum and sodium to the plants. Molybdenum is an important component of nitrogenase, nitrate reductase, xanthine oxidase and other enzymes, therefore molybdenum enzymes are the key enzymes for nitrogen assimilation and transportation, and molybdenum deficiency in plants can easily lead to nitrogen deficiency; for instance, peanuts grow with deficiency of molybdenum show underdeveloped root system and poorly developed nodules, with few and small nodules and short stems, reticular and greenish veins, leaves with different sizes of orange spots, and the leave edge wilt when there is a severely deficiency of molybdenum, some leaves are twisted into cups, and the old leaves become thicker and scorched, and all such cause serious yield reduction of peanuts. Sodium is a powerful cellular energizer, which can quickly penetrate into plants after being in contact with them, and promote the flow of protoplasm in cells, improve cellular vitality, accelerate rooting, interrupt dormancy, promote growth and development, improve product quality, increase yield, and enhance crop resistance to disease, insects, drought, flooding, cold, salinity, and collapse, etc.

Humic acid has the functions of increasing the efficiency of fertilizer, improving soil, stimulating crop growth and improving the quality of agricultural products. Zinc sulfate heptahydrate provides a trace amount of zinc. Borax provides a small amount of boron, which can promote the circulation of carbohydrates, and an appropriate amount of boron in plants can improve the supply of organic matters to all organs of crops and increase the fruit set rate and fruit bearing rate accordingly; boron also regulates the formation and operation of organic acids in plants, prevents the organic acids from accumulating in the roots and effectively prevents the occurrence of root necrosis and other conditions.

Another objective of the present application is to provide a cultivation method for maintaining SOC balance, where the method adopts the special fertilizer for intercropping maize and peanuts, and the method includes:
- S1, plot selection and plot preparation: selecting the plot with flat terrain, fertile soil, loose soil and neutral to slightly acid soil, tilling the plot, then ridging to adjust the land in terms of soil water content;
- S2, fertilizing: dividing the plot into planting areas of maize and planting areas of peanuts, and applying the special fertilizer for intercropping maize and peanuts respectively;
- S3, sowing: planting by intercropping four rows of peanuts and two rows of maize;
- S4, field management: spraying a growth regulator once during a pod setting period of the peanuts; spraying the growth regulator once during a 4-5 leaf spreading period of maize; and
- S5, rotation: switching the planting areas in a second year after harvesting maize and peanuts in a first year, planting peanuts in the planting areas of maize of the first year and planting maize in the planting areas of peanuts of the first year.

Optionally, tilling the plot in the S1 is to plow the plot with a depth of 35-40 centimeters (cm).

Optionally, the soil water content in the S1 is controlled to be in a range of 15-20%.

Optionally, in the S2, the special fertilizer for intercropping maize and peanuts used in the planting areas of maize is in an amount of 110-130 kilograms (kg) per mu (=0.0667 hectares ($hm^2$)), and that in the planting areas of peanuts is in an amount of 90-110 kg per mu.

Optionally, the maize in the S3 is planted in a row spacing of 60 cm and a planting density of 80,000 plants/$hm^2$.

Optionally, the peanuts in the S3 are planted in a row spacing of 40 cm and a planting density of 100,000 holes/$hm^2$, with two seeds in each hole.

Optionally, the steps of rotation adopt fertilizing and field management same as those of the S2 and the S4.

The present application achieves the following technical effects:
- the special fertilizer for intercropping maize and peanut includes the following raw materials: coated urea, double superphosphate, ammonium sulfate, fermented soybean meal, bentonite, sodium molybdate, borax, humic acid, ammonium dihydrogen phosphate, plant ash and zinc sulfate heptahydrate, and all such raw materials achieve a reasonable combination with synergistic effects that promote the growth and development of crops, including maize and peanuts, and improve the content of soil organic matter and soil structure. Moreover, the cultivation method for maintaining SOC balance of the application includes the steps of land selection, land preparation, fertilizing, sowing, field management and rotation; under an optimized spatial layout of crops, the cultivation method achieves improvement of utilization efficiency of light, heat, land and other resources while increasing the ventilation and light transmittance between maize plants, thus realizing the objectives of synergistic crop production and green, ecological and sustainable utilization. Moreover, the cultivation method of the present application maintains the SOC balance and keeps the nutrient content in the soil at a stable level, which further promotes crop growth. The special fertilizer and cultivation method of the present application reinforce each other and help to improve the yield and quality of crops.

BRIEF DESCRIPTION OF THE DRAWINGS

FIG. 1 shows a process of a cultivation method according to one test embodiment of the present application.

DETAILED DESCRIPTION OF THE EMBODIMENTS

Various exemplary embodiments of the present application will be described in detail. This detailed description should not be taken as a limitation of the present application, but should be understood as a rather detailed description of some aspects, characteristics and embodiments of the present application.

It should be understood that the terms mentioned in the present application are only used to describe specific embodiments, and are not used to limit the present application. In addition, for the numerical range in the present application, it should be understood that each intermediate value between the upper limit and the lower limit of the range is also specifically disclosed. Every smaller range between any stated value or the intermediate value within the stated range and any other stated value or the intermediate value within the stated range is also included in the present application. The upper and lower limits of these smaller ranges can be independently included or excluded from the range.

Unless otherwise stated, all technical and scientific terms used herein have the same meanings commonly understood by those of ordinary skill in the field to which this application relates. Although the present application only describes preferred methods and materials, any methods and materials similar or equivalent to those described herein can be used in the practice or testing of the present application. All documents mentioned in this specification are incorporated by reference to disclose and describe the methods and/or materials related to the documents. In case of conflict with any incorporated documents, the contents of this specification shall prevail.

Without departing from the scope or spirit of the present application, it is obvious to those skilled in the art that many modifications and changes can be made to the specific embodiments of the present specification. Other embodiments obtained from the description of the present application will be obvious to the skilled person. The description and embodiment of that application are only exemplary.

As used in this paper, the terms "including", "comprising", "having" and "containing" are all open terms, meaning including but not limited to.

All raw materials used in present application are conventional commercial products.

Embodiment 1

Taking 45 parts of coated urea (fly ash and polyvinyl alcohol are used as coating materials, where the fly ash and polyvinyl alcohol are in an amount of 20 percent (%) of a total weight of the coated urea, a mass ratio of fly ash to polyvinyl alcohol is 3:1, and an amount of dicyandiamide accounts for 3% of the total weight of coated urea), 25 parts of double superphosphate, 18 parts of ammonium sulfate, 4 parts of fermented soybean meal, 22 parts of bentonite, 1.2 parts of sodium molybdate, 6 parts of borax, 8 parts of humic acid, 6 parts of ammonium dihydrogen phosphate, 4 parts of plant ash, and 2 parts of zinc sulfate heptahydrate as raw materials; stirring all the raw materials after weighing in a stirrer for 5 minutes (min), and drying the stirred raw materials in an oven at 60 degree Celsius (° C.) for 5 hours (h), followed by granulating by a granulator to obtain a special fertilizer for intercropping maize and peanut.

Embodiment 2

Taking 40 parts of coated urea (fly ash and polyvinyl alcohol are used as coating materials, where the fly ash and polyvinyl alcohol are in an amount of 20% of a total weight of the coated urea, the mass ratio of fly ash to polyvinyl alcohol is 3:1, and the amount of dicyandiamide accounts for 3% of the total weight of coated urea), 30 parts of double superphosphate, 15 parts of ammonium sulfate, 5 parts of fermented soybean meal, 20 parts of bentonite, 1.5 parts of sodium molybdate, 5 parts of borax, 10 parts of humic acid, 5 parts of ammonium dihydrogen phosphate, parts of plant ash, and 1 part of zinc sulfate heptahydrate as raw materials; stirring all the raw materials after weighing in the stirrer for 5 min, and drying the stirred raw materials in an oven at for 5 h, followed by granulating by the granulator to obtain the special fertilizer for intercropping maize and peanut.

Embodiment 3

Taking 50 parts of coated urea (fly ash and polyvinyl alcohol are used as coating materials, where the fly ash and polyvinyl alcohol are in an amount of 20% of a total weight of the coated urea, the mass ratio of fly ash to polyvinyl alcohol is 3:1, and the amount of dicyandiamide accounts for 3% of the total weight of coated urea), 20 parts of double superphosphate, 20 parts of ammonium sulfate, 3 parts of fermented soybean meal, 30 parts of bentonite, 1 part of sodium molybdate, 8 parts of borax, 5 parts of humic acid, 10 parts of ammonium dihydrogen phosphate, 3 parts of plant ash, and 3 parts of zinc sulfate heptahydrate as raw materials; stirring all the raw materials after weighing in the stirrer for 5 min, and drying the stirred raw materials in an oven at for 5 h, followed by granulating by the granulator to obtain the special fertilizer for intercropping maize and peanut.

Comparative Embodiment 1

Same as Embodiment 1, with a difference that the coated urea of Embodiment 1 is replaced for resin-coated urea (purchased from Shenyang Baiyu Agricultural Technology Co., Ltd.).

Comparative Embodiment 2

Same as Embodiment 1, except that the amount of coated urea is 15 parts.

Comparative Embodiment 3

Same as Embodiment 1, except that the fermented soybean meal is not added.

Test Embodiment 1

As shown in FIG. 1, a cultivation method for maintaining soil organic carbon (SOC) balance includes:
S1, plot selection and plot preparation: selecting the plot with flat terrain, fertile soil, loose soil and neutral to partial acidity, tilling the plot with a depth of 35 centimeters (cm), then ridging to adjust the land in a soil water content of 20%;
S2, fertilizing: dividing the plot into planting areas of maize and planting areas of peanut, with two rows of maize being one planting area of maize, and four rows of corn being one planting area of maize, and two planting areas of maize and two planting area of peanut forms a group, 6 groups in total; and respectively applying the special fertilizers for intercropping maize and peanut prepared in Embodiment 1-3 and comparative embodiment 1-3 to the 6 groups, with an amount in the planting areas of maize being 120 kilograms (kg) per mu (=0.0667 hectares ($hm^2$)) and that in the planting areas of peanut being 100 kg/mu;
S3, sowing: planting by intercropping four rows of peanuts and two rows of maize, with a spacing of maize being 60 cm, planting density of 80,000 plants/$hm^2$, spacing of peanuts being 40 cm, planting density of 100,000 holes/$hm^2$, and sowing two seeds per hole;
S4, field management: spraying brassinolide once during a pod setting period of the peanuts; and spraying the brassinolide once during a 4-5 leaf spreading period of maize; and
S5, rotation: switching the planting areas in a second year after harvesting maize and peanuts in a first year, planting peanuts in the planting area of maize of the first year and planting maize in the planting area of peanut of the first year.

TABLE 1

Peanut and maize yield and soil organic carbon content

| | The first year | | | The second year | | |
|---|---|---|---|---|---|---|
| Project | Peanut yield per mu (kg) | Yield per mu of maize (kg) | SOC content (g/kg) | Peanut yield per mu (kg) | Yield per mu of maize (kg) | SOC content (g/kg) |
| Embodiment 1 | 215 | 796 | 14.6 | 224 | 808 | 15.1 |
| Embodiment 2 | 206 | 787 | 13.1 | 210 | 802 | 14.1 |
| Embodiment 3 | 203 | 792 | 14.1 | 208 | 805 | 14.1 |
| Comparative embodiment 1 | 188 | 780 | 12.5 | 195 | 785 | 11.5 |
| Comparative embodiment 2 | 179 | 773 | 12.0 | 187 | 777 | 11.0 |
| Comparative embodiment 3 | 182 | 778 | 11.5 | 191 | 782 | 10.4 |

As seen from Table 1, the yield per mu of peanuts in the first year reaches 215 kg and that of maize reaches 796 kg; given that the soil moisture, organic matter content and microbial species in different planting areas in the second year have changed, the yield per mu of peanut reaches 224 kg and that of maize reaches 808 kg by changing the maize planting areas and peanut planting areas, and the soil organic carbon content is stable and remains unchanged or has a small increase, indicating that the technical schemes of the present application not only realizes high crop yield and increased yield, but also maintains the SOC balance and has the effect of improving the soil.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. A cultivation method for maintaining soil organic carbon (SOC) balance utilizing a fertilizer for intercropping maize and peanuts, the fertilizer comprising, in parts by weight: 40-50 parts of coated urea, 20-30 parts of double superphosphate, 15-20 parts of ammonium sulfate, 3-5 parts of fermented soybean meal, 20-30 parts of bentonite, 1-1.5 parts of sodium molybdate, 5-8 parts of borax, 5-10 parts of humic acid, 5-10 parts of ammonium dihydrogen phosphate, 3-5 parts of plant ash, and 1-3 parts of zinc sulfate heptahydrate;
   wherein the coated urea is urea coated with fly ask polyvinyl alcohol, and dicyandiamide;
   wherein the fly ash and the polyvinyl alcohol are present in an amount of 20% of the total weight of the coated urea, wherein the fly ash and the polyvinyl alcohol are present in a mass ratio of 3:1; and the dicyandiamide is present in an amount of 3% of the total weight of the coated urea, wherein the method comprises:
   S1, plot selection and plot preparation: selecting a plot with flat terrain, fertile soil, loose soil and neutral to acid soil, tilling the plot, then ridging to adjust the soil in terms of soil water content;
   S2, fertilizing: dividing the plot into planting areas of maize and planting areas of peanuts, and applying the special fertilizer for intercropping maize and peanuts;
   S3, sowing: planting by intercropping four rows of peanuts and two rows of maize;
   S4, field management: spraying a growth regulator once during a pod setting period of the peanuts; spraying the growth regulator once during a 4-5 leaf spreading period of the maize; and
   S5, rotation: switching the planting areas in a second year after harvesting the maize and the peanuts in a first year, planting peanuts in the planting areas of the maize of the first year and planting maize in the planting areas of the peanuts of the first year.

2. The cultivation method according to claim 1, wherein tilling the plot in the S1 is to plow the plot with a depth of 35-40 centimeters (cm).

3. The cultivation method according to claim 1, wherein the soil water content in the S1 is controlled to be in a range of 15-20%.

4. The cultivation method according to claim 1, wherein in the S2, the fertilizer for intercropping maize and peanuts is applied to the planting areas of maize is at a rate of 110-130 kilograms (kg) per mu (=0.0667 square hectometers ($hm^2$)), and the fertilizer is applied to the planting areas of peanuts at a rate of 90-110 kg per mu.

5. The cultivation method according to claim 1, wherein the maize in the S3 is planted in a row spacing of 60 cm and a planting density of 80,000 plants/$hm^2$.

6. The cultivation method according to claim 1, wherein the peanuts in the S3 are planted in a row spacing of 40 cm and a planting density of 100,000 holes/$hm^2$ with two seeds in each hole.

* * * * *